United States Patent [19]
Berger et al.

[11] 3,862,953
[45] Jan. 28, 1975

[54] CYCLOALKENE(B)INDOLES

[75] Inventors: Leo Berger, Montclair; Alfred John Corraz, Wayne, both of N.J.

[73] Assignee: Hoffmann-La Roche Inc., Nutley, N.J.

[22] Filed: July 27, 1972

[21] Appl. No.: 275,598

Related U.S. Application Data

[63] Continuation-in-part of Ser. No. 267,330, June 29, 1972, abandoned, which is a continuation-in-part of Ser. No. 171,743, Aug. 13, 1971, abandoned.

[52] U.S. Cl......... 260/295 T, 424/263, 260/290 HL, 260/294.8 B, 260/294.8 F, 260/294.8 G, 260/294.9, 260/295 R, 260/295 A, 260/295 AM, 260/296 P, 260/296 T, 260/296 R, 260/296 AE, 260/464, 260/468 K, 260/500.5 H, 260/514 K, 260/55 ER, 260/557 R, 260/586 R

[51] Int. Cl............................................. C07d 31/40
[58] Field of Search ......... 260/290, 294.9, 295, 296

[56] References Cited
UNITED STATES PATENTS

| | | | |
|---|---|---|---|
| 2,016,480 | 10/1935 | Bockmuhl et al............. | 260/296 T |
| 3,154,556 | 10/1964 | Freed et al..................... | 260/296 T |

*Primary Examiner*—Harry I. Moatz
*Attorney, Agent, or Firm*—Samuel L. Welt; Bernard S. Leon; William G. Isgro

[57] ABSTRACT

9-(Pyridylalkyl)-1,2,3,4-tetrahydrocarbazoles and 4-(pyridylalkyl)-cyclopenta[b]indoles prepared by reacting the corresponding phenyl hydrazines and cyclohexanones or cyclopentanones, respectively, are described. The products of the invention are useful as antihyperlipidemic agents.

12 Claims, No Drawings

CYCLOALKENE (b)INDOLES

CROSS-REFERENCE TO RELATED APPLICATIONS

This application is a continuation-in-part of U.S. Pat. application Ser. No. 267,330, filed June 29, 1972, now abandoned, which in turn is a continuation-in-pat of U.S. Pat. application Ser. No. 171,743, filed Aug. 13, 1971, now abandoned.

BRIEF SUMMARY OF THE INVENTION

The invention relates to compounds of the formula

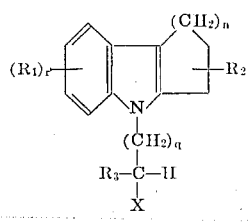

wherein $n$ and $r$ are independently 1 or 2; $q$ is 0 to 4; $R_1$ independently is hydrogen, halogen, hydroxy-lower alkyl, lower alkyl, lower alkoxy, acyl, benzyloxy, hydroxy, lower alkylthio, trifluoromethyl, carboxy, cyano, carbolower alkoxy, nitro, amino, mono-lower alklamino, di-lower alkylamino, sulfamoyl, di-lower alkylsulfamoyl or difluoromethylsulfonyl, and when $r$ is 2, $R_1$ with an adjacent $R_1$ is also lower alkylenedioxy; $R_2$ is

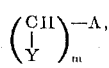

wherein A is cyano, hydroxy or lower alkoxy, Y is hydrogen or methyl, and $m$ is 0 to 7, or

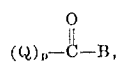

wherein B is hydroxy, carboxy, lower alkyl, lower alkoxy, amino, hydroxyamino, mono-lower alkylamino, dilower alkylamino, amino-lower alkoxy, mono-lower alkylamino-lower alkoxy, di-lower alkylamino-lower alkoxy, Q is lower alkylene and $p$ is 0 to 1; $R_3$ is hydrogen, hydroxy or lower alkyl and X is

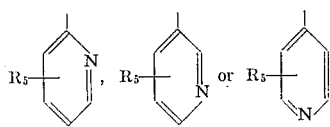

wherein $R_5$ is hydrogen or lower alkyl, their steroeisomers; addition salts thereof with pharmaceutically acceptable acids; salts thereof with pharmaceutically acceptable bases when at least one $R_1$ is carboxy and/or when B is hydroxy or carboxy; and pharmaceutically acceptable quaternary salts thereof at the pyridine N.

The end products are useful as antihyperlipidemic agents.

DETAILED DESCRIPTION OF THE INVENTION

As used herein, the term "lower alkyl" denotes a straight or branched chain hydrocarbon group containing 1–7 carbon atoms, for example, methyl, ethyl, propyl, isopropyl, butyl, isobutyl, tertiary butyl, neopentyl, pentyl, heptyl, and the like. The term "lower alkoxy" denotes an alkyl ether group in which the alkyl group is as described above, for example, methoxy, ethoxy, propoxy, isopropoxy, butoxy, pentoxy and the like. The term "lower alkylthio" denotes an alkyl thio ether group in which the alkyl group is as described above, for example, methylthio, ethylthio, propylthio, pentylthio and the like. The term "halogen" denotes all the halogens; that is, bromine, chlorine, fluorine and iodine; bromine and chlorine are preferred. The term "acyl" denotes an "alkanoyl" group derived from an aliphatic carboxylic acid of 1 to 7 carbon atoms, for example, formyl, acetyl, propionyl, and the like, and an "aroyl" group derived from an aromatic carboxylic acid, such as benzoyl and the like. The term "lower alkylene" denotes a branched or straight chain alkylene group of 1 to 7 carbon atoms such as, for example, methylene, ethylene, propylene, butylene, pentylene, α-methyl-methylene, α-methylethylene, α-methylpropylene, α-methylbutylene and the like. The term "lower alkylenedioxy" denotes an alkylene diether group in which the alkylene group is as described above, preferably, methylenedioxy.

Exemplary of mono-lower alkylamino are methylamino, ethylamino and the like. Exemplary of di-lower alkylamino are dimethylamino, diethylamino and the like. Exemplary of amino-lower alkoxy are aminomethoxy, aminoethoxy and the like. Exemplary of mono-lower alkylamino-lower alkoxy are methylamino methoxy, ethylaminoethoxy and the like. Exemplary of di-lower alkylamino-lower alkoxy are dimethylaminomethoxy, diethylaminoethoxy and the like. Exemplary of di-lower alkylsulfamoyl are dimethylsulfamoyl, diethylsulfamoyl and the like.

The invention relates to compounds of the formula

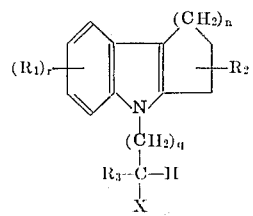

wherein $n$ and $r$ are independently 1 or 2; $q$ is 0 to 4; $R_1$ independently is hydrogen, halogen, hydroxy-lower alkyl, lower alkyl, lower alkoxy, acyl, benzyloxy, hydroxy, lower alkylthio, trifluoromethyl, carboxy, cyano, carbolower alkoxy, nitro, amino, mono-lower alkylamino, di-lower alkylamino, sulfamoyl, di-lower alkylsulfamoyl or difluoromethylsulfonyl, and when $r$ is 2, $R_1$ with an adjacent $R_1$ is also lower alkylenedioxy; $R_2$ is

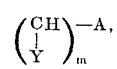

wherein A is cyano, hydroxy or lower alkoxy; Y is hydrogen or methyl, and $m$ is 0 to 7, or

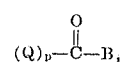

wherein B is hydroxy, carboxy, lower alkyl, lower alkoxy, amino, hydroxyamino, mono-lower alkoxy, -lower alkoxy, mono-lower alkylamino-lower alkoxy, di-lower alkylamino-lower alkoxy; Q is lower alkylene and *p* is 0 to 1; R₃ is hydrogen, hydroxy or lower alkyl; and X is

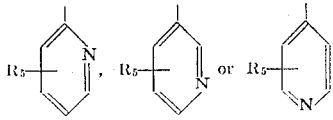

wherein R₅ is hydrogen or lower alkyl, their steroisomers; addition salts thereof with pharmaceutically acceptable acids; salts thereof with pharmaceutically acceptable bases when at least one R₁ is carboxy and/or when B is hydroxy or carboxy; and pharmaceutically acceptable quaternary salts thereof at the pyridine N.

A preferred subgenus of the compounds of formula I is characterized by the formula

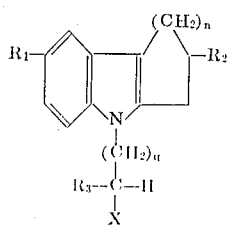

wherein R₁, R₂, R₃, X, *q* and *n* are as previously described, their stereoisomers, and the respective salts thereof as herein described.

Preferred compounds of formula I wherein *n* is 1 are characterized by the formula

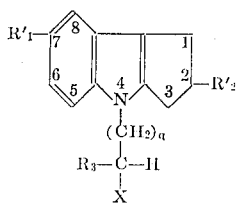

wherein R′₁ is halogen, lower alkyl or lower alkoxy; R′₂ is hydroxy-lower alkyl, carboxy or carbo-lower alkoxy; and R₃, X and *q* are as previously described. their stereoisomers, and salts thereof with pharmaceutically acceptable acids, salts therof with pharmaceutically acceptable bases when R′₂ is carboxy, and pharmaceutically acceptable quaternary salts thereof at the pyridine N.

Preferred compounds of formula I wherein *n* is 2 are characterized by the formula

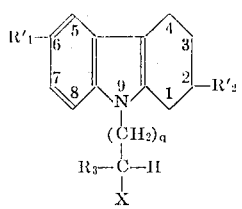

wherein R′₁ is halogen, lower alkyl or lower alkoxy; R′₂ is hydroxy-lower alkyl, carboxy or carbo-lower alkoxy; and R₃, X and *q* are as previously described, their stereoisomers, and salts thereof with pharmaceutically acceptable acids, salts thereof with pharmaceutically acceptable bases when R′₂ is carboxy, and pharmaceutically acceptable quatenary salts thereof at the pyridine N.

Preferred compounds of formula Ia′ are:
7-chloro-4-[2-(2-methyl-5-pyridyl)ethyl]-cyclopenta[b]-indole-2-carboxylic acid;
7-chloro-4-[2-(2-methyl-5-pyridyl)ethyl]-cyclopenta[b]-indole-2-carboxylic acid ethyl ester;
7-chloro-[2-(2-methyl-5-pyridyl)ethyl]-cyclopenta[b]-indole-2-methanol; and the like.

Exemplary of the compounds of the invention corresponding to formula I when *n* 1 are:
7-chloro-4-[2-(2-methyl-5-pyridyl)ethyl]cyclopenta[b]-indole-2-carboxylic acid hydrochloride;
7-chloro-4-[2-(2-methyl-5-pyridyl)ethyl]-cyclopenta[b]-indole-2-methanol hydrochloride;
4-[2-methyl-5-pyridyl)ethyl]-cyclopenta[b]indole-2-carboxylic acid;
7-methyl-4-[2-(2-methyl-5-pyridyl)ethyl-cyclopenta[b]-indole-2-carboxylic acid;
7-chloro-4-[2-hydroxy-2-(2-methyl-5-pyridyl)ethyl]cyclopenta[b]indole-2-carboxylic acid;
7-methyl-4-[1-(3-pyridyl)ethyl]-cyclopenta[b]indole-2-carboxylic acid;
7-chloro-4-[1-(3-pyridyl)ethyl]-cyclopenta[b]indole-2-carboxylic acid;
7-chloro-4-(4-pyridylmethyl)cyclopenta[b]indole-2-carboxylic acid;
7-chloro-4-(3-pyridylmethyl)cyclopenta[b]indole-2-carboxylic acid;
7-chloro-4-(2-pyridylmethyl)cyclopenta[b]indole-2-carboxylic acid;
7-chloro-4-[2-(4-pyridyl)ethyl]-cyclopenta[b]indole-2-carboxylic acid;
7-chloro-4-[3-(3-pyridyl)propyl]-cyclopenta[b]indole 2-carboxylic acid hemihydrate;
7-methyl-4-[5-(4-pyridyl)pentyl]-cyclopenta[b]indole 2-carboxylic acid;
7-chloro-4-[2-(4-pyridyl)ethyl]cyclopenta[b]indole-1carboxylic acid ethyl ester;
7-chloro-4-[2-(2-methyl-5-pyridyl)ethyl]-cyclopenta[b]indole-3-carboxylic acid ethyl ester;
7-chloro-4-[2-methyl-5-pyridyl)ethyl]cyclopenta[b]indole-1-carboxylic acid ethyl ester;
7-chloro-4-[2-(4-pyridyl)ethyl]cyclopenta[b]indole-1carboxylic acid ethyl ester;
7-chloro-4-[2-(2-methyl-5-pyridyl)ethyl]cyclopenta[b]indole-2-carboxylic acid ethyl ester hydrochloride;
7-chloro-4-[2-(2-methyl-5-pyridyl)ethyl]cyclopenta[b]indole-2-carboxylic acid methyl ester hydrocloride;
7-chloro-4-[2-(4-pyridyl)ethyl]cyclopenta[b]indole-2carboxylic acid ethyl ester hydrochloride;
7-chloro-4-[2-methyl-5-pyridyl)ethyl]cyclopenta[b]indole-2-carboxylic acid ethyl ester hydrochloride;
7-chloro-4-[2-(2-methyl-5-pyridyl)ethyl]cyclopenta[b]indole-2-carboxylic acid 2-dimethylaminoethyl ester dihydrochloride;
7-chloro-4-[2-(2-methyl-5-pyridyl)ethyl]cyclopenta[b]indole-2-carboxylic acid ethyl ester methyl sulfate;
7-chloro-4-[2-(2-methyl-5-pyridyl)ethyl]cyclopenta[b]indole-3-carboxylic acid hydrochloride;
7-chloro-4-[2-(2-methyl-5-pyridyl)ethyl]cyclopenta[b]indole-2-carboxylic acid methyl sulfate; and
7-methoxy-4-[2-methyl-5-pyridyl)ethyl]cyclopenta[b]indole-2-carboxylic acid.

Preferred compounds of formula Ib' are:
6-chloro-9-[2-(2-methyl-5-pyridyl)ethyl]-1,2,3,4-tetrahydrocarbazole-2-carboxylic acid;
6-chloro-9-[2-(2-methyl-5-pyridyl)ethyl]-1,2,3,4-tetrahydrocarbazole-2-methanol;
6-chloro-9-[2-(2-methyl-5-pyridyl)ethyl]-1,2,3,4-tetrahydrocarbazole-2-carboxylic acid ethyl ester;
6-methyl-9-[2-(2-methyl-5-pyridyl)ethyl]-1,2,3,4-tetrahydrocarbazole-2-carboxylic acid; and the like.

Exemplary of the compounds of the invention corresponding to formula I when n is 2 are:
6-chloro-9-[2-(2-methyl-5-pyridyl)ethyl]-1,2,3,4-tetrahydrocarbazole-2-methanol hydrochloride;
6-chloro-9-[2-(2-methyl-5-pyridyl)ethyl]-1,2,3,4-tetrahydrocarbazole-2-carboxylic acid;
9-[2-(2-methyl-5-pyridyl)ethyl]-1,2,3,4-tetrahydrocarbazole2-carboxylic acid;
6-methyl-9-[2-(2-methyl-5-pyridyl)ethyl]-1,2,3,4-tetrahydrocarbazole-2-carboxylic acid;
6-chloro-1,2,3,4-tetrahydro-9-[2-hydroxy-2-(2-methyl-5-pyridyl)ethyl]carbazole-2-carboxylic acid;
6-methyl-9-[1-(3-pyridyl)ethyl]-1,2,3,4-tetrahydrocarbazole-2-carboxylic acid;
6-chloro-9-[1-(3-pyridyl)ethyl]-1,2,3,4-tetrahydrocarbazole-2-carboxylic acid;
6-chloro-1,2,3,4-tetrahydro-9-(4-pyridylmethyl)carbazole-2-carboxylic acid;
6-chloro-1,2,3,4-tetrahydro-9-(3-pyridylmethyl)carbazole-2-carboxylic acid;
6-chloro-1,2,3,4-tetrahydro-9-(2-pyridylmethyl)carbazole-2-carboxylic acid;
6-chloro-1,2,3,4-tetrahydro-9-[2-(4-pyridyl)ethyl]-carbazole-2-carboxylic acid;
6-chloro-9-[3-(3-pyridyl)propyl]-1,2,3,4-tetrahydrocarbazole-2-carboxylic acid;
6-methyl-1,2,3,4-tetrahydro-9-[5-(4-pyridyl)pentyl]-carbazole-2-carboxylic acid;
6-chloro-1,2,3,4-tetrahydro-9-[2-(4-pyridyl)ethyl]-carbazole-1-carboxylic acid ethyl ester;
6-chloro-9-[2-(2-methyl-5-pyridyl)ethyl]-1,2,3,4-tetrahydrocarbazole-3-carboxylic acid ethyl ester;
6-chloro-9-[2-(2-methyl-5-pyridyl)ethyl]-1,2,3,4-tetrahydrocarbazole-1-carboxylic acid ethyl ester;
6-chloro-1,2,3,4-tetrahydro-9-[2-(4-pyridyl)ethyl[-carbazole-1-carboxylic acid ethyl ester;
6-chloro-9-[2-(2-methyl-5-pyridyl)ethyl]-1,2,3,4-tetrahydrocarbazole-2-carboxylic acid ethyl ester hydrochloride;
6-chloro-9-[2-(2-methyl-5-pyridyl)ethyl]-1,2,3,4-tetrahydrocarbazole-2-carboxylic acid methyl ester hydrochloride;
6-chloro-9-[2-(4-pyridyl)ethyl]-1,2,3,4-tetrahydrocarbazole-2-carboxylic acid ethyl ester hydrochloride;
6-chloro-9-[2-(2-methyl-5-pyridyl)ethyl]-1,2,3,4-tetrahydrocarbazole-2-carboxylic acid ethyl ester hydrochloride;
6-chloro-9-[2-(2-methyl-5-pyridyl)ethyl]-1,2,3,4-tetrahydrocarbazole-2-carboxylic acid 2-dimethylaminoethyl ester dihydrochloride;
6-chloro-9-[2-(2-methyl-5-pyridyl)ethyl]-1,2,3,4-tetrahydrocarbazole-2-carboxylic acid ethyl ester methyl sulfate;
6-chloro-9-[2-(2-methyl-5-pyridyl)ethyl]-1,2,3,4-tetrahydrocarbazole-3-carboxylic acid hydrochloride;
6-chloro-9-[2-(2-methyl-5-pyridyl)ethyl]-1,2,3,4-tetrahydrocarbazole-2-carboxylic acid methyl sulfate;

5-chloro-9-[2-(2-methyl-5-pyridyl)ethyl]-1,2,3,4-tetrahydrocarbazole-2-carboxylic acid;
7-chloro-9-[2-(2-methyl-5-pyridyl)ethyl]-1,2,3,4-tetrahydrocarbazole-2-carboxylic acid;
8-chloro-9-[2-(2-methyl-5-pyridyl)ethyl]-1,2,3,4-tetrahydrocarbazole-2-carboxylic acid;
6,7-dichloro-9-[2-(2-methyl-5-pyridyl)ethyl]-1,2,3,4-tetrahydrocarbazole-2-carboxylic acid;
6-fluoro-9-[2-(2-methyl-5-pyridyl)ethyl]-1,2,3,4-tetrahydrocarbazole-2-carboxylic acid;
6-bromo-9-[2-(2-methyl-5-pyridyl)ethyl]-1,2,3,4-tetrahydrocarbazole-2-carboxylic acid;
6-iodo-9-[2-(2-methyl-5-pyridyl)ethyl]-1,2,3,4-tetrahydrocarbazole-2-carboxylic acid;
7-trifluoromethyl-9-[2-(2-methyl-5-pyridyl)ethyl]-1,2,3,4-tetrahydrocarbazole-2-carboxylic acid;
6-methoxy-9-[2-(2-methyl-5-pyridyl)ethyl]-1,2,3,4-tetrahydrocarbazole-2-carboxylic acid;
6-hydroxymethyl-9-[2-(2-methyl-5-pyridyl)ethyl]-1,2,3,4-tetrahydrocarbazole-2-carboxylic acid;
7-methoxy-9-[2-(2-methyl-5-pyridyl)ethyl]-1,2,3,4-tetrahydrocarbazole-2-carboxylic acid;
6-difluoromethylsulfonyl-9-[2-(2-methyl-5-pyridyl)ethyl]-1,2,3,4-tetrahydrocarbazole-2-carboxylic acid;
6-carbethoxy-9-[2-(2-methyl-5-pyridyl)ethyl]-1,2,3,4-tetrahydrocarbazole-2-carboxylic acid;
6-carboxy-9-[2-(2-methyl-5-pyridyl)ethyl]-1,2,3,4-tetrahydrocarbazole-2-carboxylic acid;
6-nitro-9-[2-(2-methyl-5-pyridyl)ethyl]-1,2,3,4-tetrahydrocarbazole-2-carboxylic acid;
6-methylthio-9-[2-(2-methyl-5-pyridyl)ethyl]-1,2,3,4-tetrahydrocarbazole-2-carboxylic acid;
6-benzyloxy-9-[2-(2-methyl-5-pyridyl)ethyl]-1,2,3,4-tetrahydrocarbazole-2-carboxylic acid;
6-cyano-9-[2-(2-methyl-5-pyridyl)ethyl]-1,2,3,4-tetrahydrocarbazole-2-carboxylic acid;
6,7-methylenedioxy-9-[2-(2-methyl-5-pyridyl)ethyl]-1,2,3,4-tetrahydrocarbazol-2-carboxylic acid;
6-acetyl-9-[2-(2-methyl-5-pyridyl)ethyl]-1,2,3,4-tetrahydrocarbazole-2-carboxylic acid;
6,7-dimethyl-9-[2-(2-methyl-5-pyridyl)ethyl]-1,2,3,4-tetrahydrocarbazole-2-carboxylic acid;
6-hydroxy-9-[2-(2-methyl-5-pyridyl)ethyl]-1,2,3,4-tetrahydrocarbazole-2-carboxylic acid;
6-ethyl-9-[2-(2-methyl-5-pyridyl)ethyl]-1,2,3,4-tetrahydrocarbazole-2-carboxylic acid;
6-amino-9-[2-(2-methyl-5-pyridyl)ethyl]-1,2,3,4,-tetrahydrocarbazole-2-carboxylic acid;
6-monomethylamino-9-[2-(2-methyl-5-pyridyl)ethyl]-1,2,3,4-tetrahydrocarbazole-2-carboxylic acid;
6-dimethylamino-9-[2-(2-methyl-5-pyridyl)ethyl]-1,2,3,4-tetrahydrocarbazole-2-carboxylic acid;
6-chloro-9-[2-(2-methyl-5-pyridyl)ethyl]-1,2,3,4-tetrahydrocarbazole-2-carboxylic acid amide;
6-chloro-9-[2-(2-methyl-5-pyridyl)ethyl]-1,2,3,4-tetrahydrocarbazole-2-carboxylic acid monomethylamide;
6-chloro-9-[2-(2-methyl-5-pyridyl)ethyl]-1,2,3,4-tetrahydrocarbazole-2-carboxylic acid diethylamide;
6-chloro-9-[2-(2-methyl-5-pyridyl)ethyl]-1,2,3,4-tetrahydrocarbazole-2-acetic acid;
6-chloro-9-[2-(2-methyl-5-pyridyl)ethyl]-1,2,3,4-tetrahydrocarbazole-2-α-methylacetic acid;
6-chloro-9-[2-(2-methyl-5-pyridyl)ethyl]-1,2,3,4-tetrahydrocarbazole-2-propionic acid; and 6-chloro-9-[2-(2-methyl-5-pyridyl)ethyl]-1,2,3,4-tetrahydrocarbazole-2-butyric acid.

The end products of this invention, i.e., the compounds of formula I above, can be prepared according to the reaction sequences which follows:

REACTION SCHEME I

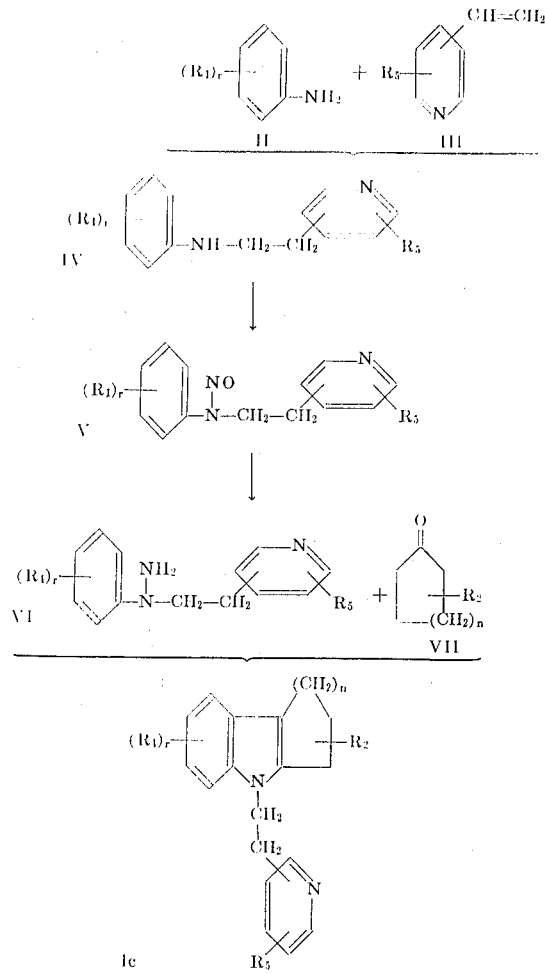

wherein $R_1$, $R_2$, $R_5$, $n$ and $r$ are as previously described.

In Reaction Scheme I, the reaction of the hydrazine of formula VI wth the cyclopentanone or cyclohexanone of formula VII to yield the cyclopenta[b]indoles or the 1,2,3,4-tetrahydrocarbazoles of formula Ic, respectively, is carried out at a temperature in the range of about room temperature to about the reflux temperature of the reaction mixture; preferably, it is carried out at the reflux temperature of the reaction mixture. The ratio of reactants employed in the condensation is not critical. The reaction is effected in the presence of a solvent, for example, water, a lower alkanol such as methanol, ethanol or the like, acetic acid, formic acid, hexane, dioxane, benzene, toluene, dimethylformamide and the like, and an acidic condensing agent as used in the Fischer Indole synthesis, for example, hydrochloric acid, sulfuric acid, phosphoric acid, zinc chloride, copper chloride, boron trifluoride and the like, and various combinations thereof. The desired end product can be recovered by known procedures, for example, crystallization, precipitation or the like.

An N-amino-N-arylaminoethylpyridine intermediate of formula VI is prepared by reduction of the corresponding N-nitrosoamine of formula V. The reduction can be effected utilizing any of the usual techniques for reducing nitroso compounds to amines, preferably by the use of a mild reducing agent, such as zinc. The reduction is suitably carried out in the presence of an aqueous acid at a temperature below room temperature, preferably in the range of between about $-5°$ and about 20°.

An N-nitrosoamine of formula V is prepared by nitrosation of the corresponding arylaminoethylpyridine derivative of formula IV. The nitrosation is suitably effected by treating a compound of formula IV with nitrous acid which can be conveniently prepared in situ from hydrochloric acid and sodium nitrite. The reaction is suitably carried out in the presence of an inert organic solvent, for example, a lower alkanol such as methanol and the like, preferably at a low temperature, i.e., a temperature in the range of between about 0° and about 25°C.

An intermediate of formula IV is prepared by the condensation of an aniline derivative of formula II and a vinylpyridine of formula III. The compounds of formulas II and III are known compounds or are analogs of known compounds readily obtained by known procedures. The condensation is carried out under anhydrous conditions employing an alkali metal such as sodium as the condensing agent. The condensation reaction can be carried out in the absence of solvent, or if desired, there can be used any anhydrous inert organic solvent. The reaction is suitably effected at an elevated temperature, e.g., in the range of between about room temperature, i.e., about 20°C. and about 100°C., though higher or lower temperatures can be used.

REACTION SCHEME II

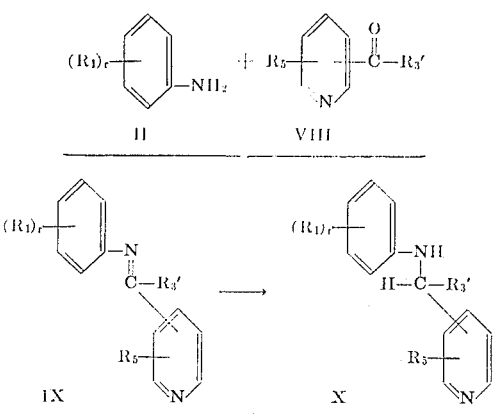

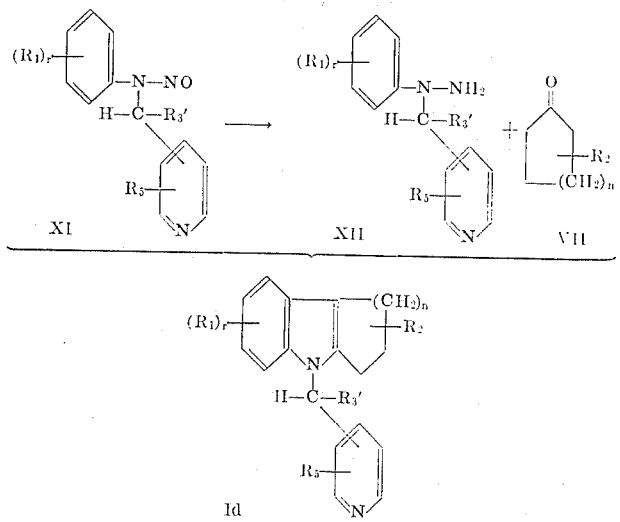

wherein $R_3'$ is hydrogen or lower alkyl, and $R_3$, $R_2$, $R_3$, n and r are as previously described.

In Reaction Scheme II, an aniline derivative of formula II, is condensed with a pyridylalkyl ketone or aldehyde of formula VIII to yield a Schiff base of formula IX. The compounds of formulas II and VIII are known compounds or are analogs of known compounds readily obtained by known procedures. The foregoing condensation is carried out at reflux temperatures, preferably in the presence of an inert organic solvent, for example, a hydrocarbon such as, for example, benzene, toluene and the like. The condensation is suitably carried out at an elevated temperature, preferably at a temperature in the range of between about room temperature and the boiling point of the reaction mixture; the preferred temperature range is the reflux temperature of the reaction mixture. Conveniently, an acid catalyst such as paratoluenesulfonic acid and the like may be used to accelerate the reaction.

A schiff base of formula IX is converted to an arylamino alkylpyridine of formula X utilizing a reducing agent such as sodium borohydride, or a hyrogenatin catalyst, e.g., palladium-on-carbon and the like. Conveniently, an inert organic solvent, for example, an alkanol such as methanol or the like, may be utilized. The reduction is suitably carried out at a temperature in the range of about 25° to about 100°C.

An arylaminoalkylpyridine of formula X is converted to the N-nitrosoamine of formula XI utilizing a nitrosating agent, for example, nitrous acid, which can be conveniently prepared in situ from hydrochloric acid and sodium nitrite. The reaction is suitably carried out in the presence of an inert organic solvent, for example, a lower alkanol such as methanol, ethanol, propanol or the like, preferably at a low temperature, i.e., at a temperature in the range of between −5° and about 25°C.

An N-nitrosoamine of formula XI is converted to an N-amino-N-arylaminoalkylpyridine of formula XII utilzing a reducing agent, preferably a mild reducing agent, for example, zinc. The reduction is suitably carried out in the presence of an aqueous acid, for example, a hydrohalic acid such as hydrochloric acid or the like, at a temperature below room temperature, preferably in the range of between about −5° and about 20°C.

The condensation of an N-amino-N-arylaminoalkylpyridine of formula XII with a cyclopentanone or cyclohexanone of formula VII, which are known compounds or are analogs of known compounds readily obtained by known procedures, to yield a cyclopenta[b]-indole or 1,2,3,4-tetrahydrocarbazole of formula Id, respectively is suitably carried out as hereinbefore described in connection with the reaction of the hydrazine of formula VI and compound of formula VII.

REACTION SCHEME III

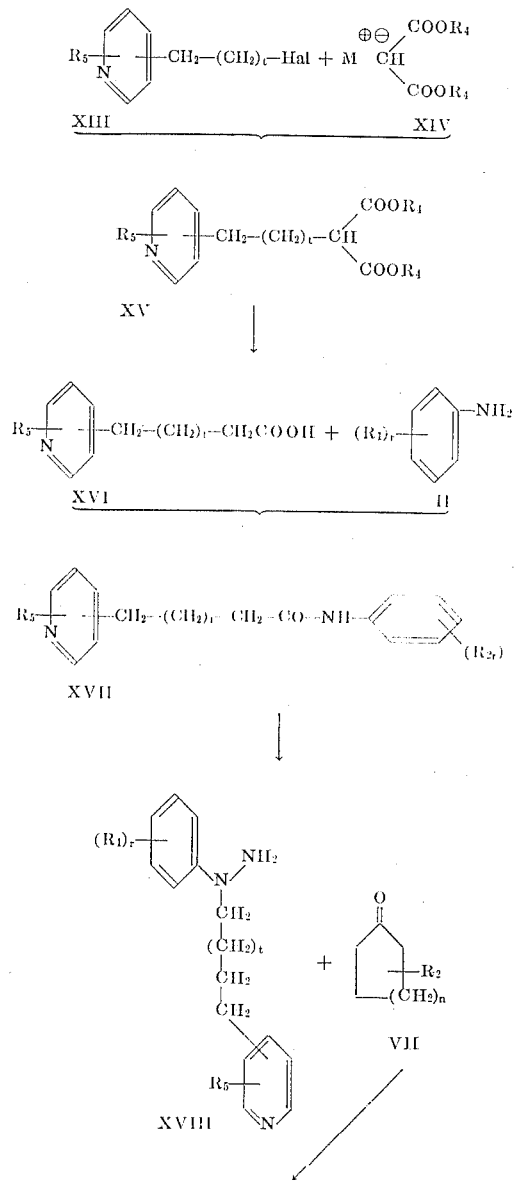

REACTION SCHEME III cont'd.

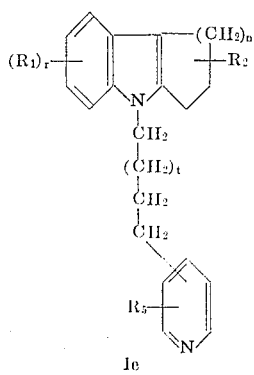

wherein $t$ is 0 to 2, M is an alkali metal; $R_4$ is lower alkyl and $R_1$, $R_3$, $n$ and $r$ are as previously described.

In Reaction Scheme III, a pyridylalkyl halide of formula XIII is condensed with an alkali metal malonic ester of formula XIV to yield the corresponding malonic acid ester of formula XV. The compounds of formula XIII and XIV are known compounds or are analogs of known compounds readily obtained by known procedures. The foregoing reaction is carried out at reflux temperature; however, higher or lower temperatures may also be utilized. Conveniently, a solvent, for example, an alkanol such as methanol, may be utilized in the condensation reaction.

A malonic ester of formula XV is converted to the corresponding pyridyl acid of formula XVI by hydrolysis and decarboxylation. A suitable acid, for example, a hydrohalic acid such as hydrochloric acid, may be utilized as an agent for effecting the hydrolysis. The decarboxylation is accomplished by heating at the reflux temperature of the reaction mixture. Thereafter, a pyridyl acid of formula XVI is condensed with an aniline derivative of formula II to yield an amide of formula XVII. The condensation is carried out at a temperature in the range of between about room temperature and the reflux temperature of the reaction mixture. Conveniently, the reaction may be carried out with or without solvents. Suitable solvents comprise hydrocarbons such as benzene, toluene, xylene and the like. The ratio of reactants is not critical.

An amide compound of formula XVII is converted to a hydrazine of formula XVIII as follows: THe compound of formula XVII is first chemically reduced. Conveniently, the chemical reduction is carried out utilizing an agent such as lithium aluminum hydride, diborane and the like. The resulting amino compound is nitrosated as hereinbefore described for the compounds of formulas IV and V. The nitroso compound which is produced is then converted to a hydrazine of formula XVIII also utilizing the procedures hereinbefore described for the conversion of a compound of formula V to a compound of formula VI.

A compound of formula XVIII is converted to a compound of formula Ie utilizing the procedures hereinbefore described for the reaction of a compound of a formula VI with a compound of formula VII. The desired end product can be recovered by known procedures.

REACTION SCHEME IV

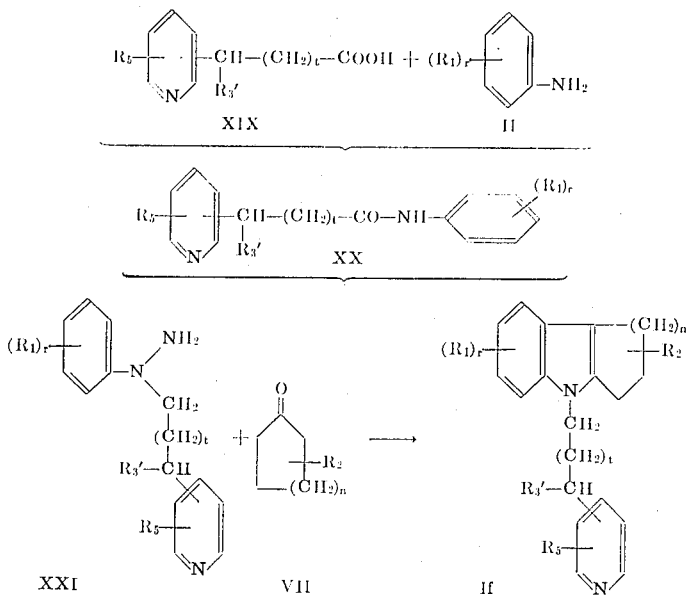

wherein $R_1$, $R_3'$, $R_5$, $t$ and $r$ are as previously described.

In Reaction Scheme IV, a compound of formula XIX is condensed with an aniline derivative of formula II to yield a compound of formula XX as hereinbefore described in connection with the condensation of a compound of formula XVI and a compound of formula II. Thereafter, the conversion of the compound of formula XX to the desired end product of formula If is effected as described in Reaction Scheme III in connection with the analogous conversion of a compound of formula XVII. The compounds of formulas XIX and II are known compounds or analogs of known compounds obtained by known procedures.

The acidic compounds of formula I, wherein B is hydroxy, and salts of such compounds with bases, can be converted to a compound of formula I, wherein B is amino-alkoxy, mono-lower alkylamino-lower alkoxy or di-lower alkylamino-lower alkoxy by known procedures. For example, a salt of such an acid of formula I is reacted with an amino-lower alkyl halide, mono-lower alkylamino-lower alkyl halide or di-lower alkylamino-lower alkyl halide, exemplary of which are aminoethyl chloride, methylaminoethyl bromide, diethylaminomethyl chloride and the like, to yield the desired end product. The temperature at which the reaction is effected is not critical; conveniently, the reaction is carried out at a temperature in the range of from about room temperature and about the reflux temperature of the reaction mixture. Conveniently, the reaction can be carried out in a polar solvent, such as dimethylformamide, dimethylsulfoxide or the like. The molar ratio of reactants is not critical. Preferably, the reactants are utilized in a 1:1 ratio.

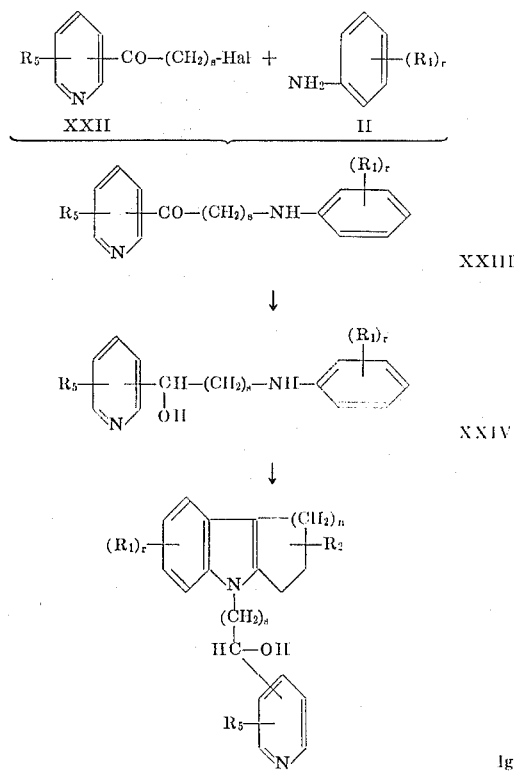

wherein s is 0 to 4; Hal is halogen and $R_1$, $R_5$, $n$ and $r$ are as previously described.

In Reaction Scheme V, a baloacyl pyridine of formula XXII is reacted with an aniline derivative of formula II to yield the corresponding compound of formula XXIII. The reaction is conveniently carried out at room temperature; however, higher or lower temperatures may also be utilized. An inert solvent, for example, a halogenated hydrocarbon such as chloroform and the like may be utilized. The compounds of formulas XXII and II are known compounds or analogs of known compounds obtained by known procedures.

The resulting aniline of formula XXIII is thereafter reduced to a compound of formula XXIV utilizing, for example, sodium borohydride or the like, in the presence of an alkanol such as methanol. The reaction is conveniently carried out at room temperature; however, higher or lower temperatures may also be utilized.

Thereafter, the amino compound of formula XXIV is converted to the desired end product of formula Ig as hereinbefore described in connection with the analogous conversion of a compound of formula IV.

The compounds of formula I, wherein one or more of $R_1$ is hydroxymethyl, can be prepared by treating the respective compound of formula I, wherein correspondingly one or more of $R_1$ is methoxycarbonyl, with a reducing agent such as, for example, lithium aluminum hydride and the like.

The compounds of formula I, wherein one or more of $R_1$ is carboxy, can be prepared by treating the respective compound of formula I, wherein correspondingly one or more of $R_1$ is methoxycarbonyl, with a hydrolyzing agent such as, for example, sodium hydroxide and the like.

The compounds of formula I form addition salts with pharmaceutically acceptable organic or inorganic acids such as hydrohalides, e.g., hydrochloride, hydrobromide, hydroiodide, other mineral acid salts such as sulfate, nitrate, phosphate and the like, alkyl- and monoaryl sulfonates such as ethane-sulfonate, toluenesulfonate, benzenesulfonate, or the like, other organic acid salts, such as acetate, tartrate, maleate, citrate, benzoate, salicylate, ascorbate and the like. When at least one $R_1$ is amino, mono-lower alkylamino or di-lower alkylamino, and/or when B is amino-lower alkyl, mono-lower alkylamino-lower alkyl or di-lower alkylamino-lower alkyl, the compounds of formula I form diacid addition salts.

The compounds of formula I, when at least one $R_1$ is carboxy and/or B is hydroxy or carboxy, also can form salts with pharmaceutically acceptable bases. Exemplary of such bases are alkali metal hydroxides, such as sodium hydroxide, potassium hydroxide, and the like; alkaline earth hydroxides, such as calcium hydroxide, barium hydroxide and the like; sodium alkoxides, such as sodium etholate, potassium etholate and the like; organic bases such as piperidine, diethanolamine, N-methylglucamine and the like. Also included are the aluminum salts of the compounds of formula I, when $R_1$ is carboxy and/or B is hydroxy or carboxy.

The compounds of formula I and their pharmaceutically acceptable salts are distinguishable by their hypolipidemic activity, i.e., their activity in lowering serum triglyceride and cholesterol, and are thereafter useful as antihyperlipidemic agents in the treatment of, for example, atherosclerosis. The useful hypolipidemic activity of the compounds of formula I and their pharmaceutically acceptable salts is demonstrated in warm-blooded animals utilizing known and accepted procedures, for example, male Charles River rats (weighing 160–180 grams) are allowed excess to food and water ad libitum. The test compound is administered by oral intubation to groups of 7 rats each at various doses for 9 working days. The animals are sacrificed on the tenth day and a sample of blood is taken by cardiac puncture and analyzed for serum cholesterol and triglyceride utilizing autoanalytic procedures. (See, for example, Block et al. and Kessler and Lederer, in "Automation in Analytical Chemistry," [1966], pp. 345 and 341, respectively.)

When 6-chloro-9-[2-(2-methyl-5-pyridyl)ethyl]-1,2,3,4-tetrahydrocarbazole-2-carboxylic acid, which has demonstrated in mice an $LD_{50}$ of greater than 4,000 mg/kg. p.o. is utilized as the test substance, serum triglyceride and serum cholesterol are lowered following administration of 50 and 100 mg/kg/day.

The compounds of formula I and their pharmaceutically acceptable salts have effects qualitatively similar to those of Clofibrate, known for its therapeutic uses and properties. Thus, the compounds of formula I demonstrate a pattern of activity associated with hypolipidemic agents of known efficacy and safety.

The compounds of the invention, i.e., the compounds of formula I, exist as stereoisomers, i.e., diastereomers or enantiomers. The separation of the mixture of diastereoisomers can be carried out by known procedures. Preferably, the diastereoisomers are separated by fractional crystallization of the base or acid addition salts thereof from a solvent such as, for example, acetone or from a solvent mixture such as methanol/diethyl ether. Other possible methods comprise fractional distillation of the volatile bases, column or thin layer chromatography or vapor phase chromatography. The resolution of the enantiomers into the optically active isomers, can be carried out by known procedures, for example, by chemical resolution. By this method, diastereoisomers are formed from the racemic mixture with an optically active resolving agent, for example, an optically active base such as d-$\alpha$-(1-naphthyl)ethylamine. The formed diastereoisomers are separated by selective crystallization and converted to the corresponding optical isomer. Thus, the invention covers the stereoisomers of the compounds of formula I, i.e., diastereomers or enantiomers, as well as their optically active isomers.

The compounds of formula I, their enantiomers and salts thereof as herein described, can be incorporated into standard pharmaceutical dosage forms, for example, they are useful for oral or parenteral application with the usual pharmaceutical adjuvant material, for example, organic or inorganic inert carrier materials such as water, gelatin, lactose, starch, magnesium stearate, talc, vegetable oils, gums, polyalkyleneglycols, and the like. The pharmaceutical preparations can be employed in a solid form, for example, as tablets, troches, suppositories, capsules, or in liquid form, for example, as solutions, suspensions or emulsions. Pharmaceutical adjuvant materials can be added and include preservatives, stabilizers, wetting or emulsifying agents, salts to change the osmotic pressure or to act as buffers. The pharmaceutical preparations can also contain other therapeutically active substances.

The following Examples further illustrate the invention. All parts are by weight and all temperatures are in °C., unless otherwise mentioned.

EXAMPLE 1

Preparation of (±) 6-chloro-9-[2-(2-methyl-5-pyridyl)ethyl]-1,2,3,4-tetrahydrocarbazole-2-carboxylic acid hydrochloride

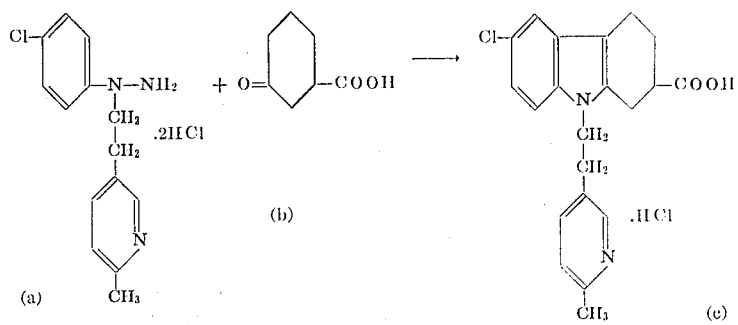

A mixture of 10 g. of 1-(p-chlorophenyl)-1-[2-(2-methyl-5-pyridyl)ethyl]hydrazine dihydrochloride (a),
4.5 g. of cyclohexanone-3-carboxylic acid (b) and 50 ml. of 80 percent acetic acid (40 ml. of HOAc and 10 ml. of $H_2O$) was stirred under an atmosphere of nitrogen at room temperature. After 2 hours, the reaction mixture was heated to reflux and stirred at reflux for 2.5 hours. The reaction mixture was concentrated to 1/3 of its original volume on a rotary evaporator (bath about 60°) and 300 ml. of warm (50°) 4N hydrochloric acid was added to the residue. The resulting turbid solution was filtered and cooled to room temperature. After seeding, the solution was placed in a refrigerator (+5°) for 48 hours. Following filtration, the filter cake was washed with cooled 6N hydrochloric acid (2 × 20 ml.) and as much solvent as possible was removed from the filter cake by suction. The salt was dried in a vacuum oven (70°) over NaOH yielding 10.8 g. of crude product, mp 218°–220°. Recrystallization from 100 ml. of 1N hydrochloric acid gave 9.2 g. (75.5 percent) of 6-chloro-9-[2-(2-methyl-5-pyridyl)ethyl]-1,2,3,4-tetrahydrocarbazole-2-carboxylic acid hydrochloride (c), mp 219°–220° (sintering at about 216°).

Calcd. for $C_{21}H_{21}ClN_2O_2 \cdot HCl$ (405.33)

C, 62.23; H, 5.47; N, 6.91

Found: C, 62.28; H, 5.33; N, 6.94

By the same procedure as is described in detail in this example, the following compounds were prepared:

substituting 1-[2-(2-methyl-5-pyridyl)ethyl]phenylhydrazine for (a), there was obtained 9-[2-(2-methyl-5-pyridyl)ethyl]-1,2,3,4-tetrahydrocarbazole-2-carboxylic acid, mp 184°–185° (EtOH).

Calcd. for $C_{21}H_{22}N_2O_2$ (M.W. 334)

C, 75.42; H. 6.63; N, 8.38

Found: C, 75.37; H, 6.83; N, 8.64;

Substituting 1-[2-(2-methyl-5-pyridyl)ethyl]-1-p-tolylhydrazine for (a), there was obtained 6-methyl-9-[2-(2-methyl-5-pyridyl)ethyl]-1,2,3,4-tetrahydrocarbazole-2-carboxylic acid, mp 210°–211° (EtOH).

Calcd. for $C_{22}H_{24}N_2O_2$ (M.W. 348.43)

C, 75.83;; H, 6.94; N, 8.04

Found: C, 75.70; H, 6.96; N, 7.98;

substituting 1-(p-chlorophenyl)-1-[2-(2-methyl-5-pyridyl)-2-hydroxyethyl]hydrazine for (a), there was obtained 6-chloro-1,2,3,4-tetrahydro-9-[2-hydroxy-2-(2-methyl-5-pyridyl)ethyl]carbazole-2-carboxylic acid, (diasteriomers) mp 251°–252° (EtOH).

Calcd. for $C_{21}H_{21}ClN_2O_3$ (M.W. 384.86)

C, 65.53; H, 5.50; N, 7.28

Found: C, 65.55; H, 5.62; N, 7.25;

substituting 1-[1-(3-pyridyl)ethyl]-1-p-tolylhydrazine for (a), there was obtained 6-methyl-9-[1-(3-pyridyl)ethyl]-1,2,3,4-tetrahydrocarbazole-2-carboxylic acid (diasteriomers), mp 248°–250° (EtOH).

Calcd. for $C_{21}H_{22}N_2O_2$ (M.W. 334.41)

C, 75.42; H, 6.63; N, 8.38

Found: C, 75.58; H, 6.67; N, 8.38, the hydrochloride hydrate salt of 6-methyl-9-[1-(3-pyridyl)ethyl-1,2,3,4-tetrahydrocarbazole-2-carboxylic acid (cistrans isomers) had a mp of 187°–188° (1N HCl).

Calcd. for $C_{21}H_{22}N_2O_2.HCl.H_2O$ (M.W. 388.90)
C, 64.86; H, 6.48; N, 7.21
Found: C, 64.86; H, 6.36; N, 7.33;

substituting 1-(p-chlorophenyl)-1-[1-(3-pyridyl)ethyl]hydrazine for (a), there was obtained 6-chloro-9-[1-(3-pyridyl)ethyl]-1,2,3,4-tetrahydrocarbazole-2-carboxylic acid (diasteriomers) (amorphous solid); the hydrochloride hydrate salt of 6-chloro-9-[1-3-pyridyl)ethyl]-1,2,3,4-tetrahydrocarbazole-2-carboxylic acid (diasteriomers) had a mp of 247°–249° (1N HCl).

Calcd. for $C_{20}H_{19}ClN_2O_2.HCl.H_2O$ (M.W. 409.32)
C, 58.68; H, 5.42; N, 6.85
Found: C, 58.67; H, 5.34; N, 6.77;

substituting 1-(p-chlorophenyl)-1-(4-pyridylmethyl)-hydrazine for (a), there was obtained 6-chloro-1,2,3,4-tetrahydro-9-[4-(pyridyl)methyl]carbazole-2-carboxylic acid, mp 297°–298° (EtOH).

Calcd. for $C_{19}H_{17}ClN_2O_2$ (M.W. 340.81)
C, 66.96; H, 5.03; N, 8.22
Found: C, 67.21; H, 5.21; N, 8.49;

substituting 1-(p-chlorophenyl)-1-(3-pyridylmethyl)-hydrazine for (a) there was obtained 6-chloro-1,2,3,4-tetrahydro-9-(3-pyridylmethyl)carbazole-2-carboxylic acid, mp 262°–263° ($H_2O$).

Calcd. for $C_{19}H_{17}ClN_2O_2$ (M.W. 340.81)
C, 66.96; H, 5.03; N, 8.22
Found: C, 67.03; H, 5.09; N, 8.19;

substituting 1-(p-chlorophenyl)-1-(2-pyridylmethyl)-hydrazine for (a), there was obtained 6-chloro-1,2,3,4-tetrahydro-9-(2-pyridylmethyl)carbazole-2-carboxylic acid, mp 218°–220° (MeOH).

Calcd. for $C_{19}H_{17}ClN_2O_2$ (M.W. 340.81)
C, 66.96; H, 5.03; N, 8.22
Found: C, 66.83; H, 5.06; N, 8.03;

substituting 1-(p-chlorophenyl)-1-[2-(4-pyridyl)ethyl]hydrazine for (a), there was obtained 6-chloro-1,2,3,4-tetrahydro-9-[2-(4-pyridyl)ethyl]carbazole-2-carboxylic acid, mp 262°–263° (EtOH).

Calcd. for $C_{20}H_{19}ClN_2O_2$ (M.W. 354.84)
C, 67.69; H, 5.40; N, 7.90
Found: C, 67.43; H,, 5.20; N, 7.77,
the hydrochloride hemihydrate of 6-chloro-1,2,3,4-tetrahydro-9-[2-(4-pyridyl)ethyl]carbazole-2-carboxylic acid was prepared.

Calcd. for $C_{20}H_{19}ClN_2O_2 . HCl.0.5H_2O$ (M.W. 400.31)
C, 60.00; H, 5.29; N, 7.00
Found: C, 59.88; H, 5.67; N, 7.00;

substituting 1-(p-chlorophenyl)-1-[3-(3-pyridyl)propyl]hydrazine for (a), there was obtained 6-chloro-9-[3-(3-pyridyl)propyl]-1,2,3,4-tetrahydrocarbazole-2-carboxylic acid hemihydrate, mp 171°–172° (EtOH).

Calcd. for $C_{21}H_{21}ClN_2O_2 . 0.5H_2O$ (M.W. 377.87)
C, 66.75; H, 5.87; N, 7.42
Found: C, 66.91; H, 5.90; N, 7.60;

substituting 1-[5-(4-pyridyl)pentyl]-1-(p-tolyl)hydrazine for (a), there was obtained 6-methyl-1,2,3,4-tetrahydro-9-[5-(4-pyridyl)pentyl]carbazole-2-carboxylic acid, mp 173°–174° (EtOH).

Calcd. for $C_{24}H_{28}N_2O_2$ (M.W. 376.48)
C, 76.56; H, 7.50; N, 7.44
Found: C, 76.84; H, 7.62; N, 7.43;

substituting 1-(p-chlorophenyl)-1-[2-(4-pyridyl)ethyl]hydrazine for (a) and cyclohexanone-2-carboxylic acid ethyl ester for (b), there was obtained 6-chloro-1,2,3,4-tetrahydro-9-[2-(4-pyridyl)ethyl]carbazole-1-carboxylic acid ethyl ester(syrup) $C_{22}H_{23}ClN_2O_2$ (M.W. 382.87); the hydrochloride hydrate salt of 6-chloro-1,2,3,4-tetrahydro-9-[2-(4-pyridyl)ethyl]carbazole-1-carboxylic acid ethyl ester has a mp of 163°–164° (EtOH/3N HCl).

Calcd. for $C_{22}H_{23}ClN_2O_2.HCl.H_2O$ (M.W. 437.36)
C, 60.41; H, 5.99; N, 6.48
Found: C, 60.11; H, 5.68; N, 6.29;

substituting cyclohexanone-4-carboxylic acid ethyl ester for (b), there was obtained 6-chloro-9-[2-(2-methyl-5-pyridyl)ethyl]-1,2,3,4-tetrahydrocarbazole-3-carboxylic acid ethyl ester, which hydrolyzed with base gave 6-chloro-9-[2-(2-methyl-5-pyridyl)ethyl]-1,2,3,4-tetrahydrocarbazole-3-carboxylic acid, mp 219°–221° (iso PrOH).

Calcd. for $C_{21}H_{21}ClN_2O_2$ (M.W. 368.86)
C, 68.38; H, 5.74; N, 7.60
Found: C, 68.39; H, 5.92; N, 7.56,
the hydrochloride salt of 6-chloro-9-[2-(2-methyl-5-pyridyl)ethyl]-1,2,3,4-tetrahydrocarbazole-3-carboxylic acid has a mp of 266–268° (EtOH/EtOAc).

Calcd. for $C_{21}H_{21}ClN_2O_2 . HCl$ (M.W. 405.33)
C, 62.22; H, 5.47; N, 6.91
Found: C, 62.33; H, 5.59; N, 6.77;

substituting cyclohexanone-2-carboxylic acid ethyl ester for (b), there was obtained 6-chloro-9-[2-(2-methyl-5-pyridyl)ethyl]-1,2,3,4-tetrahydrocarbazole-1-carboxylic acid ethyl ester, which hydrolyzed with base gave 6-chloro-9-[2-(2-methyl-5-pyridyl)ethyl]-1,2,3,4-tetrahydrocarbazole-1-carboxylic acid, mp 172°–174° (EtOH). Calcd. for $C_{21}H_{21}ClN_2O_2$ (M.W. 368.86)
C, 68.38; H, 5.74; N, 7.59
Found: C, 68.38; H, 5.74; N, 7.78,
the hydrochloride salt of 6-chloro-9-[2-(2-methyl-5-pyridyl)ethyl]-1,2,3,4-tetrahydrocarbazole-1-carboxylic acid has a mp of 152°–153° (decomp.) (EtOH/$Et_2O$).

Calcd. for $C_{21}H_{21}ClN_2O_2.HCl$ (M.W. 405.33)
C, 62.23; H, 5.47; N, 6.91
Found: C, 61.82; H, 5.88; N, 6.57;

substituting 1-(p-chlorophenyl)-1-[2-(4-pyridyl)ethyl]hydrazine for (a) and cyclohexanone-2-carboxylic acid ethyl ester for (b), there was obtained 6-chloro-1,2,3,4-tetrahydro-9-[2-(4-pyridyl)ethyl]carbazole-1-carboxylic acid ethyl ester, which hydrolyzed with base gave 6-chloro-1,2,3,4-tetrahydro-9-[2-(4-pyridyl)ethyl]carbazole-1-carboxylic acid, mp 167°–168° (EtOAc).

Calcd. for $C_{20}H_{19}ClN_2O_2$ (M.W. 354.85)
C, 67.70; H, 5.40; N, 7.89
Found: C, 67.87; H, 5.34; N, 7.88,
the hydrochloride hemihydrate salt of 6-chloro-1,2,3,4-tetrahydro-9-[2-(4-pyridyl)ethyl]carbazole-1-carboxylic acid has a mp of 220°–222°.

Calcd. for $C_{20}H_{19}ClN_2O_2 . HCl.0.5H_2O$ (M.W. 400.32)
C, 60.00; H, 5.29; N, 7.00
Found: C, 59.89; H, 5.25; N, 7.01;

substituting 3-cyclohexanone acetic acid for (b) there was obtained 6-chloro-1,2,3,4-tetrahydro-9-[2-(2-methyl-5-pyridyl)ethyl]carbazole-2-acetic acid, mp 157°–159° (EtOH).

Calcd. for $C_{22}H_{23}ClN_2O_2$ (M.W. 382.89)
C, 69.01; H, 6.06; N, 7.32
Found: C, 69.26; H, 6.16; N, 7.35,
the hydrochloride salt of 6-chloro-1,2,3,4-tetrahydro- 9-[2-(2-methyl-5-pyridyl)ethyl]carbazole-2-acetic had a mp of 259°–261° (EtOH/Et$_2$O).

Calcd. for C$_{22}$H$_{23}$ClN$_2$O$_2$. HCl (M.W. 419.36)
C, 63.01; H, 5.77; N, 6.68
Found: C, 63.38; H, 5.78; N, 6.78;

substituting 2-methyl-5-(N-amino-2-p-chlorophenylaminoethyl)pyridine-N-oxide (pyridine N) for (a) there was obtained 6-chloro-9-[2-(2-methyl-5-pyridyl)ethyl]-1,2,3,4-tetrahydrocarbazole-2-carboxylic acid pyridine N-oxide, mp 231°–232°.

Calcd. for C$_{21}$H$_{21}$ClN$_2$O$_3$ (M.W. 384.86)
C, 65.53; H, 5.50; N, 7.28
Found: C, 65.73; H, 5.44; N, 7.26;

substituting 3-cyclopentanone carboxylic acid for (b) there was obtained 7-chloro-4-[2-(2-methyl-5-pyridyl)ethyl]-1,2,3,4-tetrahydrocyclopent[b]indole-2-carboxylic acid, mp 215°–216° (EtOH).

Calcd. for C$_{20}$H$_{19}$ClN$_2$O$_2$ (M.W, 354.84)
C, 67.69; H, 5.40; N, 7.90
Found: C, 67.37; H, 5.46; N, 7.75, the hydrochloride salt of 7-chloro-4-[2-(2-methyl-5-pyridyl)-ethyl]-1,2,3,4-tetrahydrocyclopent[b]indole-2-carboxylic acid had a mp of 214°–215° (EtOH/Et$_2$O).

Calcd. for C$_{20}$H$_{19}$ClN$_2$O$_2$. HCl (M.W. 391.31)
C, 61.38; H, 5.15; N, 7.16
Found: C, 61.11; H, 5.14; N, 7.10;

substituting N$^1$-[p-tolyl]-N$^1$-2-[(2-methyl-5-pyridyl)-ethyl]hydrazine for (a) and 3-cyclohexanone acetic acid for (b) there was obtained 6-methyl-9-[2-(2-methyl-5-pyridyl)ethyl]-1,2,3,4-tetrahydrocarbazole-2-acetic acid, mp 148°–150° (EtOAc).

Calcd. for C$_{23}$H$_{26}$N$_2$O$_2$ (M.W. 362.46)
C, 76.21; H, 7.23; N, 7.32
Found: C, 76.14; H, 7.24; N, 7.52.

EXAMPLE 2

Preparation of 6-chloro-9-[2-(2-methyl-5-pyridyl)ethyl]-1,2,3,4-tetrahydrocarbazole-2-carboxylic acid ethyl ester hydrochloride

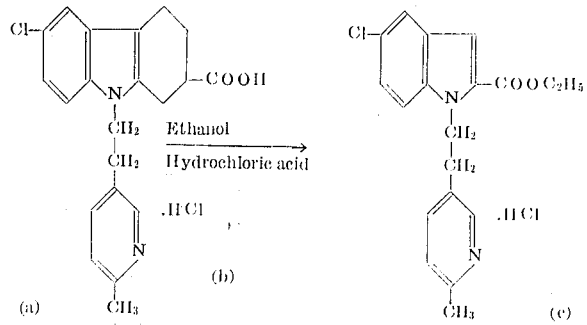

A solution of 5 g. of 6-chloro-9-[2-(2-methyl-5-pyridyl)ethyl]-1,2,3,4-teterahydrocarbazole-2-carboxylic acid hydrochloride, 100 ml. of ethanol and 3 ml. of 8N alcoholic hydrogen chloride was stirred at reflux for 6 hours. The solution was then concentrated to dryness on a Rotavapor and the residue was recrystallized from 50 ml. of ethanol, yielding 3.1 g. of the hydrochloride salt of 6-chloro-9-[2-(2-methyl-5-pyridyl)ethyl]-1,2,3,4-tetrahydrocarbazole-2-carboxylic acid ethyl ester, mp 203°–204°.

Calcd. for C$_{23}$H$_{25}$ClN$_2$O$_2$. HCl (M.W. 433.38)
C, 63.74; H, 6.05; N, 6.47
Found: C, 63.60; H, 6.07; N, 6.49.

By the same procedure as is described in detail in this example, the following compounds were prepared:
substituting 6-methyl-9-[2-(2-methyl-5-pyridyl)ethyl]-1,2,3,4-tetrahydrocarbazole-2-carboxylic acid hydrochloride for (a), there was obtained 6-methyl-9-[2-(2-methyl-5-pyridyl)ethyl.1,2,3,4-tetrahydrocarbazole-2-carboxylic acid ethyl ester hydrochloride, m.p. 196°–197° (EtOH/Et$_2$O).

Calcd. for C$_{24}$H$_{28}$N$_2$O$_2$.HCl (M.W. 412.95)
C, 69.80; H, 6.83; N, 6.79
Found: C, 69.73; H, 7.13; N, 6.74;

substituting MeOH/Catalytic Amount H$_2$SO$_4$ for (b), there was obtained 6-chloro-9-[2-(2-methyl-5-pyridyl)ethyl]-1,2,3,4-teterahydrocarbazole-2-carboxylic acid methyl ester hydrochloride, mp 196°–198° (MeOH/EtOAc/Et$_2$O).

Calcd. for C$_{22}$H$_{23}$ClN$_2$O$_2$.HCl (M.W. 419.35)
C, 63.01; H, 5.77; N, 6.68
Found: C, 63.15; H, 5.82; N, 6.65;

substituting 6-chloro-9-[2-(4-pyridyl)ethyl]-1,2,3,4-tetrahydrocarbazole-2-carboxylic acid hydrochloride for (a), there was obtained 6-chloro-9-[2-(4-pyridyl)ethyl]-1,2,3,4-tetrahydrocarbazole-2-carboxylic acid ethyl ester hydrochloride, mp 170.5°–173° (EtOH).

Calcd. for C$_{22}$H$_{23}$ClN$_2$O$_2$.HCl (M.W. 419.34)
C, 63.01; H, 5.77; N, 6.68; Cl, 16.90
Found: C, 62.76; H, 5.87; N, 6.59; Cl, 16.70;

substituting n-butanol and hydrochloric acid for (b) there was obtained 6-chloro-9-[2-(2-methyl-5-pyridyl)ethyl]-1,2,3,4-tetrahydrocarbazole-2-carboxylic acid butyl ester hydrochloride, mp 158°–160.5°.

Calcd. for C$_{25}$H$_{29}$ClN$_2$O$_2$.HCl (M.W. 461.43)
C, 65.06; H, 6.55; N, 6.07
Found: C, 64.84; H, 6.67; N, 6.07.

EXAMPLE 3

An Alternate Preparation of 6-chloro-9-[2-(2-methyl-5-pyridyl)ethyl]-1,2,3,4-tetrahydrocarbazole-2-carboxylic acid hydrochloride A solution of 4 g. of cyclohexanone-3-carboxylic acid, 6 g. of 1-(p-chlorophenyl)-1-[2-(2-methyl-5-pyridyl)ethyl]-hydrazine and 50 ml. of benzene was stirred and heated at reflux for 18 hours. 0.41 ml. of water was removed from the reaction mixture by means of a Dean Stark trap. The reaction mixture was then concentrated under reduced pressure, and 50 ml. of 6.8N alcoholic hydrogen chloride was carefully added to the stirred cooled residue. After the addition, the reaction mixture was stirred under reflux for 3 hours. Upon cooling, the reaction mixture was poured into a mixture of ice and water. Sodium hydroxide (6N) was added until the pH was 10. The liberated base was extracted with ether. In turn, the ether extract was washed by extraction with water and dried over sodium sulfate. Following filtration of the desiccant and evaporation of the ether, 5.3 g. of a waxy solid was obtained. Crystallization from ethyl acetate yielded 3.3 g. of 6-chloro-9-[2 -(2-methyl-5-pyridyl)ethyl]-1,2,3,4-tetrahydrocarbazole-2-carboxylic acid ethyl ester, mp 144°–145°. A mixture of 0.5 g. of the above ester and 10 ml. of 20 percent sodium hydroxide was refluxed for 2 hours. The reaction mixture was cooled in an ice bath (3 hours) and filtered. The wet precipitate was dissolved in 35 ml. of hot water and the solution was made strongly acidic with concentrated hydrochloric acid. After standing several days at room temperataure, the precipitate was filtered and washed with cold 1N hydrochloric acid. Drying of the precipitate yielded 0.35 g. of 6-chloro-9[2-(2-methyl-5-pyridyl)ethyl]-1,2,3,4- tetrahydrocarbazole-2-carboxylic acid hydrochloride, mp 218°–220°.

EXAMPLE 4

Preparation of 6-chloro-9-[2-(2-methyl-5-pyridyl)ethyl]-1,2,3,4-tetrahydrocarbazole-2-carboxylic acid 2-dimethylaminoethyl ester dihydrochloride A mixture of 4 g. of 6-chloro-9-[2-(2-methyl-5-pyridyl)ethyl]-1,2,3,4-tetrahydrocarbazole-2-carboxylic acid, 30 ml. of dimethylformamide and 0.6 g. of 54.5 percent sodium hydride suspended in mineral oil was stirred at room temperature under an atmosphere of dry nitrogen for 30 minutes. A solution of 1.6 g. of dimethylaminoethylchloride in 10 ml. of dimethylformamide was added dropwise to the above stirred mixture. After the addition, the mixture was stirred and heated at 50°C. for 7 hours. After cooling, the reaction mixture was poured into a mixture of ice and water, and extracted with ether. The ether extract was washed by extraction with dilute sodium bicarbonate, followed by water extraction. The ether extract was dried over sodium sulfate and after filtration of the desiccant and evaporation of the ether, a residue of 3.4 g. was obtained. The residue was dissolved in ethanol and a slight excess of 7.5N alcoholic hydrogen chloride was added. The mixture was concentrated to dryness under reduced pressure at room temperature. Recrystallization of the residue from a mixture of ethyl acetate and methanol yielded 2.2 g. of 6-chloro-9-[2-(2-methyl-5-pyridyl)ethyl]-1,2,3,4-2-carboxylic acid 2-dimethylaminoethyl ester dihydrochloride, mp 166°–167°.

Anal. Calcd. for $C_{25}H_{30}ClN_3O_2 \cdot 2HCl$ (M.W. 512.90)
C, 58.54; H, 6.29; N, 8.19
Found: C, 58.53; H, 6.87; N, 8.06

EXAMPLE 5

Preparation of 6-chloro-9-[2-(2-methyl-5-pyridyl)ethyl]-1,2,3,4-tetrahydrocarbazole-2-carboxylic acid ethyl ester methylsulfate (at pyridine N)

A mixture of 0.5 g. of 6-chloro-9-[2-(2-methyl-5-pyridyl)ethyl]-1,2,3,4-tetrahydrocarbazole-2-carboxylic acid ethyl ester, 10 ml. of acetone and 0.2 ml. of dimethylsulfate was refluxed and stirred for 6 hours. Upon cooling to room temperature, the reaction mixture was filtered. The filter cake was washed with cold acetone and air dried, yielding 0.5 g. of 6-chloro-9-[2-(2-methyl-5-pyridyl)ethyl]1,2,3,4-tetrahydrocarbazole-2-carboxylic acid ethyl ester methylsulfate. Recrystallization from acetone afforded 0.36 g., mp 146°–147°.

Anal. Calcd. for $C_{25}H_{31}ClN_2O_6S$ (M.W. 523.03)
C, 57.41; H, 5.97; N, 5.36
Found: C, 57.28; H, 6.09; N, 5.27

EXAMPLE 6

Preparation of 6-chloro-9-[2-(2-methyl-5-pyridyl)ethyl]-1,2,3,4-tetrahydrocarbazole-3-carboxylic acid hydrochloride A mixture of 11.7 g. of 1-(p-chlorophenyl)-1-[2-methyl-5-pyridyl)ethyl]hydrazine, 50 ml. of 80 percent acetic acid and 6 g. of cyclohexanone-4-carboxylic acid ethyl ester was stirred under an atmosphere of nitrogen at room temperature. After 2 hours, the mixture was heated. Following 2 hours at reflux and stirring, the heating was stopped and the reaction mixture cooled. It was then poured into a mixture of 600 g. of ice and water. Sodium hydroxide (6N) was added carefully until the pH was near 8. The gummy precipitate that formed was filtered and washed with cold water. Upon air drying, a yield of 13.8 g. was obtained. The precipitate was then dissolved in a solution of 50 ml. of ethanol and 50 ml. of 6N sodium hydroxide. The mixture was stirred and heated to reflux. After 4 hours at reflux, the mixture was concentrated to dryness on a Rotavapor and the residue was dissolved in 2 liters of warm water. The turbid solution was then filtered. Glacial acetic acid was added to the filtrate until the pH was near 7. The precipitate that formed was filtered and washed with water. Upon air drying, a yield of 11.2 g. was obtained. Recrystallization of the precipitate from n-propanol gave 7.4 g., mp 219°–221°. The crystalline product was then suspended in 100 ml. of ethanol and alcoholic hydrogen chloride was added until the solution became strongly acidic. The salt that formed was completely soluble in alcohol. Ethyl acetate was added to induce crystallization and after standing for several hours at room temperature the resultant precipitate was filtered. After drying, 6.4 g. of 6-chloro-9-[2-(2-methyl-5-pyridyl)ethyl]-1,2,3,4-tetrahydrocarbazole-3-carboxylic acid hydrochloride, mp 266°–268° was obtained.

Anal. Calcd. for $C_{21}H_{21}ClN_2O_2 \cdot HCl$ (M.W. 405.33)
C, 62.22; H, 5.47; N, 6.91
Found: C, 62.33; H, 5.59; N, 6.77

EXAMPLE 7

Preparation of 4-chloro-(6-methylnicotinoylmethyl)aniline

A mixture of 1.5 g. of 5-(α-bromoacetyl)-2-methylpyridine, 20 ml. of chloroform and 1 g. of p-chloroaniline was stirred under an atmosphere of dry nitrogen at room temperature for 50 hours. The reaction mixture was partitioned between chloroform and dilute sodium bicarbonate. The chloroform layer was separated and washed with water. After the chloroform solution had dried over sodium sulfate, the desiccant was removed by filtration and the chloroform evaporated at reduced pressure. The residue was triturated with 500 ml. of cool 1N hydrochloric acid and filtered. Dilute sodium bicarbonate was carefully added to the filtrate until the evolution of carbon dioxide ceased. The mixture was filtered and the filter cake was washed with water. After air drying, a yield of 1.0 g. was obtained. Crystallization from ethanol afforded 0.3 g. of 4-chloro-(6-methylnicotinoylmethyl) aniline, mp 163°–165°.

Anal. Calcd. for $C_{14}H_{13}ClN_2O$ (M.W. 260.72)
C, 64.50; H, 5.03; N, 10.75
Found: C, 64.49; H, 5.12; N, 10.78

EXAMPLE 8

Preparation of 4-chloro-N-[2-(2-methyl-5-pyridyl)-2-hydroxyethyl]aniline dihydrochloride In small portions, 100 mg. of sodium borohydride was added to a cooled (+5°), stirred solution of 200 mg. of 4-chloro-(6-methylnicotinoylmethyl)aniline in 10 ml. of dry ethanol. The reaction mixture was stirred at room temperature for 1 hour. 50 ml. of water was added, and the mixture was extracted with ether. The ether extract was washed with water and dried over anhydrous magnesium sulfate. Following filtration of the desiccant, a slight excess (2.2 mole) of 7.2N alcoholic hydrogen chloride was added. The precipitate was filtered, washed with ether and dried, yielding 250 mg. Crystallization from a mixture of ethyl acetate and methanol afforded 125 mg. of 5-chloro-N-[2-(2-methyl-5-pyridyl)-2-hydroxyethyl]aniline dihydrochloride, mp 182°–185°.

Anal. Calcd. for $C_{14}H_{15}ClN_2O \cdot 2HCl$ (M.W. 335.67)
C, 50.09; H, 5.11; N, 8.35
Found: C, 49.78; H, 5.17; N, 8.21

Example 9

Preparation of 4-chloro-N-[2-(2-methyl-5-pyridyl)-2-hydroxyethyl]N-nitrosoaniline A solution of 0.7 g. of sodium nitrite in 2 ml. of water was added dropwise to a stirred solution of 1.3 g. of 4-chloro-N-[2-(2-methyl-5-pyridyl)-2-hydroxyethyl]aniline dihydrochloride dissolved in 15 ml. of water. After the addition, the mixture was stirred for 2 hours at room temperature and filtered. The filter cake was washed with water and air dried, yielding 1.2 g. of 4-chloro-N-[2-(2-methyl-5-pyridyl)-2-hydroxyethyl]-N-nitrosoaniline, mp 129°–131°.

EXAMPLE 10

Preparation of 1-(p-chlorophenyl)-1-[2-(2-methyl-5-pyridyl)-2-hydroxyethyl]hydrazine Over the course of 20 minutes, 1.5 g. of zinc dust was added portionwise to a cold, (−10°C., acetone and dry ice bath) stirred mixture of 1.2 g. of 4-chloro-N-[-2-(2-methyl-5-pyridyl)-2-hydroxyethyl]-N-nitrosoaniline, 10 ml. of acetic acid and 4 ml. of water. After the addition, the reaction mixture was stirred at −10° for 10 minutes and 50 ml. of cold water was added. The mixture was filtered. Ice was added to the filtrate and it was made alkaline with 6N sodium hydroxide. The mixture was then extracted with ether. In turn, the ether extract was washed by extraction with water and dried over magnesium sulfate. After the desiccant had been removed by filtration and the ether evaporated, the residue was dissolved in 30 ml. of ethanol. A slight excess of 7.5N alcoholic hydrogen chloride was added, followed by several volumes of ether to induce crystallization. After several hours, the crystalline salt was filtered, washed with cold ethanol and dried, yielding 0.85 g. of 1-(p-chlorophenyl)-1-[2-(2-methyl-5-pyridyl)-2-hydroxyethyl]hydrazine, mp 215°–216°.

EXAMPLE 11

Preparation of 6-chloro-9-[2-(2-methyl-5-pyridyl)ethyl]-1,2,3,4-tetrahydrocarbazole-2-carboxylic acid, methyl sulfate (at pyridine N)

A mixture of 2.3 g. of 6-chloro-9-[2-(2-methyl-5-pyridyl)-ethyl]-1,2,3,4-tetrahydrocarbazole-2-carboxylic acid, 30 ml. of acetone and 1 ml. of dimethylsulfate was stirred at reflux for 8 hours. After the mixture has cooled to room temperature, it was filtered. The filter cake was washed with acetone. Upon drying, a yield of 2.7 g. of 6-chloro-9-2-(2-methyl-5-pyridyl)-ethyl]-1,2,3,4-tetrahydrocarbazole-2-carboxylic acid methyl sulfate, mp 197°–200° was obtained.

Anal. Calcd. for $C_{22}H_{24}ClN_2O_2{}^+CH_3SO_4{}^-$ (M.W. 494.99)
C, 55.81; H, 5.50; N, 5.66
Found: C, 55.66; H, 5.55; N, 5.69

EXAMPLE 12

Preparation of [3-(4-pyridyl)propyl]malonic acid diethylester

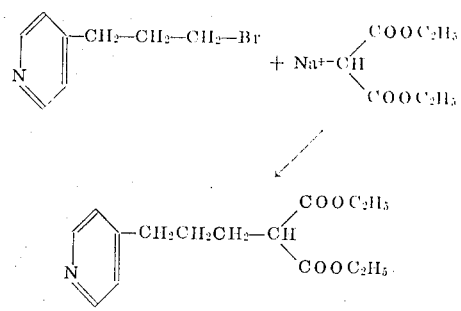

A mixture of 2.3 g. of sodium and 75 ml. of ethanol was stirred at room temperature until all the sodium had dissolved. When the solution had cooled to room temperature, 16 g. of diethylmalonate was added. The mixture was stirred for 10 minutes at room temperature and 20 g. of 3-(4-pyridyl)propylbromide was added dropwise. Following the last addition, the reaction was heated to reflux temperature. After the reaction mixture had been at reflux temperature and stirring for 6 hours, it was concentrated to dryness under reduced pressure. Ice (300 g.) was added to the residue and the mixture was made acid with concentrated hydrochloric acid. The acid solution was washed by extraction with ether (2 × 200 ml.). More ice (100 g.) was added and 6N sodium hydroxide was added until the reaction mixture was strongly alkaline. The mixture was extracted with ether (4 × 200 ml.) and in turn the ether extract was washed with water (3 × 50 ml.). After the ether solution had dried over anhydrous sodium carbonate, the desiccant was filtered off and the ether evaporated, yielding after distillation 9.2 g., b.p. 140°–145° at 0.15 mm. $N_D{}^{21}$ 1.4888.

EXAMPLE 13

Preparation of 5-(4-pyridyl)valeric acid hydrochloride

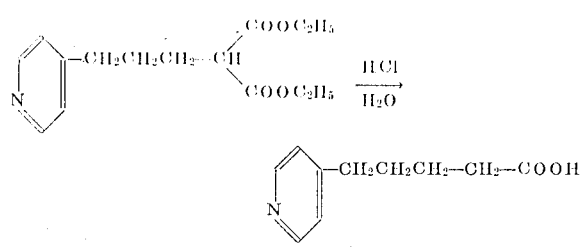

A solution of 9.2 g. of [3-(4-pyridyl)propyl]malonic acid diethylester and 50 ml. of 3N hydrochloric acid was heated with stirring to reflux temperature. After 4 hours at reflux, the reaction mixture was concentrated to dryness under reduced pressure. The residue was triturated with acetone and the mixture was filtered. Drying of the filter cake yielded 7.8 g. Following recrystallization from a mixture of ethanol and ethyl acetate, 4.7 g., m.p. 199°–200° was obtained.

EXAMPLE 14

Preparation of 5-(4-pyridyl)-N-(p-tolyl)valeric acid amide

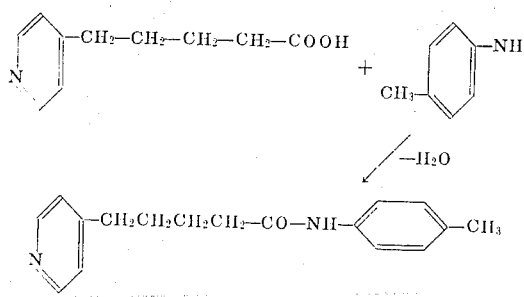

A mixture of 23 g. of 5-(4-pyridyl)valeric acid hydrochloride and 20 g. of p-toluidine was heated to 215°–217° for 6 hours under a stream of nitrogen (the water formed and the excess toluidine slowly distilled from the reaction mixture). When the reaction mixture had cooled to room temperature, it was stirred with a mixture of 300 ml. of ether and 300 ml. of 1N sodium hydroxide. After 1 hour of stirring, the mixture was filtered. The filter cake was washed with water and then with ether. Air drying on the filter cake afforded 27.2 g., m.p. 99°–105°. Upon recrystallization of the amide, the melting point became 113°–114°.

Anal. Calcd. for $C_{17}H_{20}N_{2}O$ (M.W. 263.35)
C, 76.08; H, 7.51; N, 10.44
Found: C, 76.14; H, 7.42; N, 10.24

EXAMPLE 15

Preparation of N-[5-(4-pyridyl)pentyl]-p-toluidine

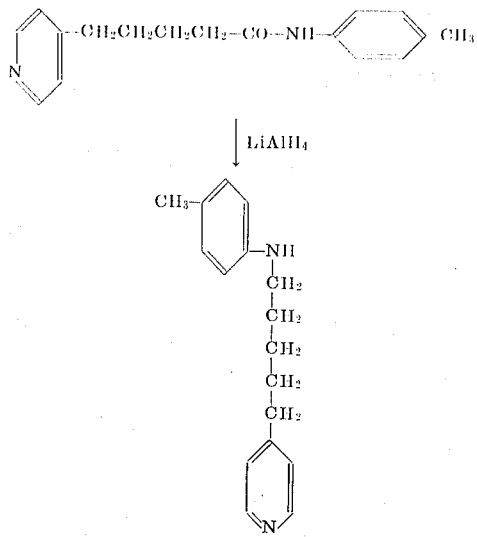

Under an atmosphere of dry nitrogen, 27 g. of 5-(4-pyridyl)-N-(p-tolyl)valeric acid amide (powdered) was added slowly to a stirred mixture of 12 g. of lithium aluminum hydride in 900 ml. of ether. Following the addition, the reaction mixture was heated and stirred under reflux temperature for 12 hours. The reaction mixture was then cooled in an ice bath to 5° and 120 ml. of cold water was added dropwise (temperature < 10°). After the addition of water, the reaction mixture was stirred at room temperature for 3 hours and filtered. The filter cake was washed with ether. The filtrate and ether washings were combined and dried over anhydrous sodium carbonate. Following filtration of the desiccant and evaporation of the ether, a yield of 20.5 g., b.p. 180°–181°/0.08 mm. was obtained.

EXAMPLE 16

Preparation of 6-chloro-9-[2-(2-methyl-5-pyridyl)ethyl]-1,2,3,4-tetrahydrocarbazole-2-methanol hydrochloride A suspension of 4.0 g. of 6-chloro-9-[2-(2-methyl-5-pyridyl)-ethyl]-1,2,3,4-tetrahydrocarbazole-2-carboxylic acid ethyl ester in 300 ml. of ether was added slowly to a stirred mixture of 2 g. of lithium aluminum hydride (dry nitrogen atmosphere) in 100 ml. of ether. After the addition, the mixture was heated to reflux, and maintained at reflux, with stirring, for 7 hours and thereafter cooled in an ice-water bath (10°). Cold water (40 ml.) was added dropwise with stirring. After the addition, the mixture was stirred at room temperature for 1 hour and filtered. The filter cake was washed with ether. The filtrate and washings were combined and dried over anhydrous sodium sulfate. Following filtration and concentration, a yield of 4.3 g. was obtained. The base was dissolved in ethanol and a slight excess of alcoholic hydrogen chloride was added, followed by several volumes of ether. The crystalline precipitate was filtered, washed with ether and dried; yield 2.7 g. of 6-chloro-9-[2-(-methyl-5-pyridyl)ethyl]-1,2,3,4-tetrahydrocarbazole-2-methanol hydrochloride, m.p. 191°–193°.

Anal. Calcd. for $C_{21}H_{23}ClN_{2}O \cdot HCl$ (M.W. 391.34)
C, 64.45; H, 6.18; N, 7.16
Found: C, 64.57; H, 6.16; N, 7.20.

EXAMPLE 17

Preparation of 6-chloro-9-[2-(2-methyl-5-pyridyl)ethyl]-1,2,3,4-tetrahydrocarbazole-2-hydroxamic acid A solution of 3.6 g. of potassium hydroxide in 10 ml. of methanol was added slowly to a cooled stirred solution of 3 g. of hydroxylamine hydrochloride in 16 ml. of methanol. The mixture was stirred for 10 minutes in an ice bath (temperature about 10°) and filtered. To the stirred filtrate 5.6 g. of 6-chloro-9-[2-(2-methyl-5-pyridyl)ethyl]-1,2,3,4-tetrahydrocarbazole-2-carboxylic acid ethyl ester was added. The mixture was heated gently on a steam bath until the solid was completely dissolved and then allowed to stand at room temperature for 18 hours. The solution was concentrated to dryness and 300 ml. of water was added to the residue. Following filtration, the pH of the filtrate was adjusted to 7 with acetic acid. The mixture was stirred at room temperature for 3 hours, filtered, washed with water and dried; yielding 7.5 g. Upon recrystallization from ethanol, there was obtained 2.4 g. of 6-chloro-9-[2-(2-methyl-pyridyl)ethyl]-1,2,3,4-tetrahydrocarbazole-2-hydroxamic acid, m.p. 208°–209°.

Anal. Calcd. for $C_{21}H_{22}ClN_{3}O_{2}$ (M.W. 383.88)
C, 65.71; H, 5.78; N, 10.95
Found: C, 65.62; H, 5.94; N, 10.79

EXAMPLE 18

Tablet Formulation

| | Per Tablet |
|---|---|
| 6-Chloro-9-[2-(2-methyl-5-pyridyl)ethyl]-1,2,3,4-tetrahydrocarbazole-2-carboxylic acid | 500 mg. |

-Continued

Tablet Formulation

| | Per Tablet |
|---|---|
| Corn Starch | 30 mg. |
| Lactose | 88 mg. |
| Gelatin | 12 mg. |
| Talcum | 15 mg. |
| Magnesium Stearate | 5 mg. |
| Total Weight | 650 mg. |

Procedure:

1. 500 parts of 6-chloro-9-[2-(2-methyl-5-pyridyl)ethyl]-1,2,3,4-tetrahydrocarbazole-2-carboxylic acid and 88 parts of lactose are thoroughly mixed in suitable blending equipment and granulated with a 10 percent gelatin solution.

2. The moist mass is passed through a No. 12 screen, and the granules are dried on paper-lined trays overnight.

3. The dried granules are passed through a No. 14 screen and placed in a suitable mixer. 15 Parts of talcum and 5 parts of magnesium stearate are added and blended.

4. The granulation is compressed into tablets weighing approximately 650 mg. each, using punches having an approximate diameter of 12.7 mm. (one-half inch). The final tablet thickness is about 5.1 mm.

EXAMPLE 19

Tablet Formulation

| 250 mg. | Per Tablet |
|---|---|
| 6-Chloro-9-[2-(2-methyl-5-pyridyl)ethyl]-1,2,3,4-tetrahydrocarbazole-2-carboxylic acid | 250 mg. |
| Dicalcium Phosphate Dihydrate, Unmilled | 235 mg. |
| Corn Starch | 70 mg. |
| FD and C Yellow No. 5-Aluminum Lake 25 percent | 2 mg. |
| Durkee 117* | 25 mg. |
| Calcium Stearate | 3 mg. |
| Total Weight | 585 mg. |

Procedure:

1. All the ingredients are mixed thoroughly and Fitzed (Model D) using a No. 1A screen, medium speed.

2. The mixture is remixed and slugged.

3. The slugs are screened on an Oscillator through a No. 14 mesh screen and compressed on an "E" machine.

EXAMPLE 20

Capsule Formulation

| | Per Capsule |
|---|---|
| 6-Chloro-9-[2-(2-methyl-5-pyridyl)ethyl]-1,2,3,4-tetrahydrocarbazole-2-carboxylic acid | 50 mg. |
| Lactose, U.S.P. | 125 mg. |
| Corn Starch, U.S.P. | 30 mg. |
| Talc, U.S.P. | 5 mg. |
| Total Weight | 210 mg. |

Procedure:

1. 50 Parts of 6-chloro-9-[2-(2-methyl-5-pyridyl)ethyl]-1,2,3,4-tetrahydrocarbazole-2-carboxylic acid are mixed with 125 parts of lactose and 30 parts of corn starch in a suitable mixer.

2. The mixture is further blended by passing through a Fitzpatrick Comminuting Machine with a No. 1A screen with knives forward.

3. The blended powder is returned to the mixer, and 5 parts of talc are added and blended thoroughly.

4. The mixture is filled into No. 4 hard shell gelatin capsules on a Parke Davis capsulating machine.

EXAMPLE 21

Capsule Formulation

| | Per Capsule |
|---|---|
| 6-Chloro-9-[2-(2-methyl-5-pyridyl)ethyl]-1,2,3,4-tetrahydrocarbazole-2-carboxylic acid | 250 mg. |
| Lactose | 60 mg. |
| Corn Starch | 35 mg. |
| Magnesium Stearate | 5 mg. |
| Total Weight | 350 mg. |

Procedure:

1. All of the ingredients are mixed until thoroughly blended in a suitable size container.

2. The powder is filled into No. 2, two piece, hard shell gelatin capsules to an approximate fill weight of 350 mg. using a Parke Davis capsulating machine. (Any similar type machine may be used.)

EXAMPLE 22

Suspension Formulation

| | mg/ml. |
|---|---|
| 6-Chloro-9-[2-(2-methyl-5-pyridyl)ethyl]-1,2,3,4-tetrahydrocarbazole-2-carboxylic acid | 20.0 |
| Methyl paraben U.S.P. | 0.9 |
| Propyl paraben U.S.P. | 0.2 |
| Veegum S-6814 * | 105.0 |
| Myrj 45 ** | 7.5 |
| Sucrose | 550. |
| Glycerin | 125. |
| Benzoic Acid | 2.5 |
| Sorbitol | 210. |
| Lactic Acid 85 percent | 11. |
| Antifoam C Emulsion (Medical Grade) *** | 0.033 |
| Sodium hydroxide solution qs. pH 3.6–4.0 | |
| Distilled Water qs. to | 1 ml. |

* Complex magnesium aluminum silicate
** Water-dispersible mixture of polyoxyalkylene derivatives of fatty acids
*** Emulsion of dimethylpolysiloxane Procedure:

1. Part of the distilled water is heated to near boiling, methyl and propyl parabens and 6-chloro-9-[2-(2-methyl-5-pyridyl)ethyl]-1,2,3,4-tetrahydrocarbazole-2-carboxylic acid are added and stirred. Veegum is added with agitation, heating continued, and stirred for approximately one hour. Myrj 45, sucrose and glycerin are added and dissolved.

2. In a separate container, sodium hydroxide, benzoic acid, disodium sequestrene and sorbitol are added to part of the distilled water. This solution is then added to the Veegum suspension, and the lactic acid is added with stirring.

3. A dispersion of Antifoam C in part of the distilled water is prepared and added to the above suspension. pH to 3.6-4.0 is adjusted, as required with sodium hydroxide and qs with distilled water.

4. The suspension is passed through a mill and versator (to remove air); agitation is continued during filling.

We claim:
1. A compound of the formula

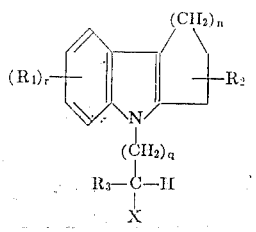

wherein n and r are independently 1 or 2; q is 0 to 4; $R_1$ independently is hydrogen, halogen, hydroxy-lower alkyl, lower alkyl, lower alkoxy, alkanoyl of 1 to 7 carbon atoms, benzoyl, benzyloxy, hydroxy, lower alkylthio, trifluoromethyl, carboxy, cyano, carbo-lower alkoxy, nitro, amino, mono-lower alkylamino, di-lower alkylamino, sulfamoyl, di-lower alkylsulfamoyl or difluoromethylsulfonyl, and when r is 2, $R_1$ with an adjacent $R_1$, is also lower alkylenedioxy; $R_2$ is

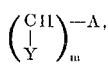

wherein A is cyano, hydroxy or lower alkoxy, Y is hydrogen or methyl, and m is 0 to 7, or

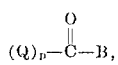

wherein B is hydroxy, lower alkoxy, amino, hydroxyamino, mono-lower alkylamino, di-lower alkylamino, amino-lower alkoxy, mono-lower alkylamino-lower alkoxy, di-lower alkylamino-lower alkoxy, Q is lower alkylene and p is 0 to 1; $R_3$ is hydrogen, hydroxy or lower alkyl; and X is

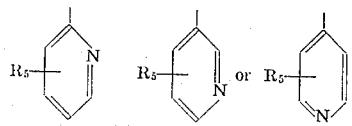

wherein $R_5$ is hydrogen or lower alkyl, a stereoisomer thereof; an addition salt thereof with a pharmaceutically acceptable acid; a salt thereof with a pharmaceutically acceptable base when at least one $R_1$ is carboxy and/or when B is hydroxy; or the methylsulfate quaternary salt thereof at the pyridine N.

2. A compound in accordance with claim 1,

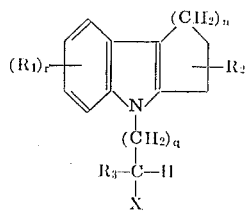

wherein n is independently 1 or 2; q is 0 to 4; $R_1$ is hydrogen, halogen, hydroxy-lower alkyl, lower alkyl, lower alkoxy, alkanoyl of 1 to 7 carbon atoms, benzoyl, benzyloxy, hydroxy, lower alkylthio, trifluoromethyl, carboxy, cyano, carbo-lower alkoxy, nitro, amino, mono-lower alkylamino, di-lower alkylamino, sulfamoyl, di-lower alkylsulfamoyl or difluoromethylsulfonyl; $R_2$ is

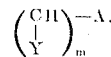

wherein A is cyano, hydroxy or lower alkoxy, Y is hydrogen or methyl, and m is 0 to 7, or

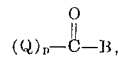

wherein B is hydroxy, lower alkoxy, amino, hydroxyamino, mono-lower alkylamino, di-lower alkylamino, amino-lower alkoxy, mono-lower alkylamino-lower alkoxy, di-lower alkylamino-lower alkoxy, Q is alkylene and p is 0 to 1; $R_3$ is hydrogen, hydroxy or lower alkyl; and X is

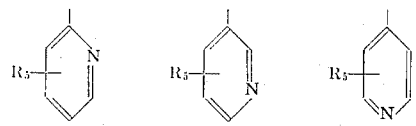

wherein $R_5$ is hydrogen or lower alkyl, a stereoisomer thereof; an addition salt thereof with a pharmaceutically acceptable acid; a salt thereof with a pharmaceutically acceptable base when at least one $R_1$ is carboxy and/or when B is hydroxy; or the methylsulfate quaternary salt thereof at the pyridine N.

3. A compound in accordance with claim 2,

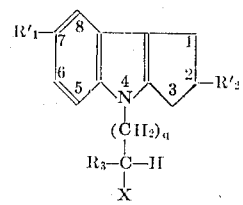

wherein $R'_1$ is halogen, lower alkyl or lower alkoxy; $R'_2$ is hydroxy-lower alkyl, carboxy or carbo-lower alkoxy; q is 0 to 4; $R_3$ is hydrogen, hydroxy or lower alkyl; and X is

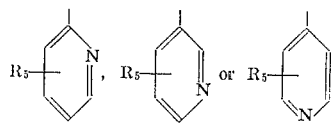

wherein $R_5$ is hydrogen or lower alkyl, a stereoisomer thereof; an addition salt thereof with a pharmaceutically acceptable acid; a salt thereof with a pharmaceutically acceptable base when $R'_2$ is carboxy; or the methylsulfate quaternary salt thereof at the pyridine N.

4. A compound in accordance with claim 2,

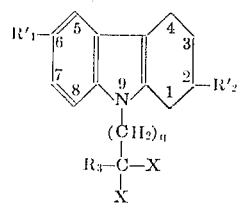

wherein R'₁ is halogen, lower alkyl or lower alkoxy; R'₂ is hydroxy-lower alkyl, carboxy or carbo-lower alkoxy; q is 0 to 4; R₃ is hydrogen, hydroxy or lower alkyl; and X is

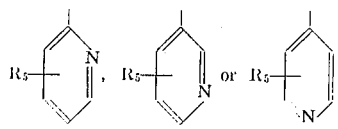

wherein R₅ is hydrogen or lower alkyl, a stereoisomer thereof; an addition salt thereof with a pharmaceutically acceptable acid; a salt thereof with a pharmaceutically acceptable acid; a salt thereof with a pharmaceutically acceptable base when R'₂ is carboxy; or the methylsulfate quaternary salt thereof at the pyridine N.

5. A compound in accordance with claim 4, 6-chloro-9-[2-(2-methyl-5-pyridyl)ethyl]-1,2,3,4-tetrahydrocarbazole-2-carboxylic acid.

6. A compound in accordance with claim 4, 6-chloro-9-[2-(2-methyl-5-pyridyl)ethyl]-1,2,3,4-tetrahydrocarbazole-2-carboxylic acid ethyl ester.

7. A compound in accordance with claim 4, 6-methyl-9-[2-(2-methyl-5-pyridyl)ethyl]-1,2,3,4-tetrahydrocarbazole-2-carboxylic acid.

8. A compound in accordance with claim 4, 6-chloro-9-[2-(2-methyl-5-pyridyl)ethyl]-1,2,3,4-tetrahydrocarbazole-2-methanol.

9. A compound in accordance with claim 3, 7-chloro-4-[2-(2-methyl-5-pyridyl)ethyl]cyclopenta[b]indole-2-carboxylic acid.

10. A compound in accordance with claim 3, 7-chloro-4-[2-(2-methyl-5-pyridyl)ethyl]cyclopenta[b]indole-2-carboxylic acid ethyl ester.

11. A compound in accordance with claim 4, 6-chloro-9-[2-(2-methyl-5-pyridyl)ethyl]-1,2,3,4-tetrahydrocarbazole-2-carboxylic acid hydrochloride.

12. A compound in accordance with claim 4, 6-chloro-9-[2-(2-methyl-5-pyridyl)ethyl]-1,2,3,4-tetrahydrocarbazole-2-methanol hydrochloride.

* * * * *

UNITED STATES PATENT OFFICE
CERTIFICATE OF CORRECTION

Patent No. 3,862,953  Dated January 28, 1975

Inventor(s) Leo Berger and Alfred John Corraz

It is certified that error appears in the above-identified patent and that said Letters Patent are hereby corrected as shown below:

Column 29, claim 2, lines 52-62,

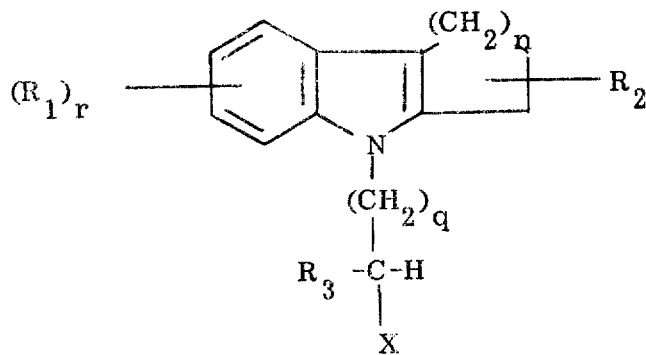

should be:

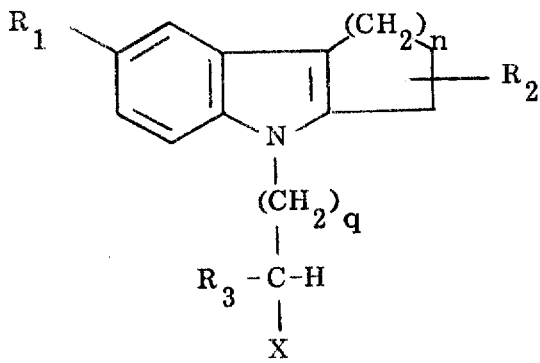

Signed and sealed this 15th day of July 1975.

(SEAL)
Attest:

RUTH C. MASON
Attesting Officer

C. MARSHALL DANN
Commissioner of Patents
and Trademarks